United States Patent
Pham

(10) Patent No.: US 7,653,770 B2
(45) Date of Patent: Jan. 26, 2010

(54) TIME MULTIPLEXED BIDIRECTIONAL BUS

(75) Inventor: Chi M. Pham, Lawndale, CA (US)

(73) Assignee: Xerox Corporation, Stamford, CT (US)

( * ) Notice: Subject to any disclaimer, the term of this patent is extended or adjusted under 35 U.S.C. 154(b) by 274 days.

(21) Appl. No.: 11/654,777

(22) Filed: Jan. 18, 2007

(65) Prior Publication Data

US 2008/0175274 A1    Jul. 24, 2008

(51) Int. Cl.
G06F 13/42 (2006.01)
G06F 13/36 (2006.01)
G06F 13/362 (2006.01)
H04L 5/14 (2006.01)

(52) U.S. Cl. .................. 710/106; 710/117; 370/294
(58) Field of Classification Search .......... 710/31, 710/105–106, 117, 124, 306–307; 370/294
See application file for complete search history.

(56) References Cited

U.S. PATENT DOCUMENTS

| | | | | |
|---|---|---|---|---|
| 3,967,058 A | * | 6/1976 | Moriya et al. | 370/294 |
| 4,404,672 A | * | 9/1983 | Shimizu | 370/294 |
| 4,467,473 A | * | 8/1984 | Arnon et al. | 370/288 |
| 4,481,572 A | * | 11/1984 | Ochsner | 710/117 |
| 4,603,418 A | * | 7/1986 | Townsend | 370/449 |
| 4,796,256 A | * | 1/1989 | Opderbeck et al. | 370/294 |
| 4,984,234 A | * | 1/1991 | Vergnaud et al. | 370/359 |
| 5,388,231 A | * | 2/1995 | Starr | 710/105 |

(Continued)

OTHER PUBLICATIONS

"The Free On-Line Dictionary of Computing". Entry 'tri-state'. Online Jul. 27, 1996. Retrieved from Internet Dec. 12, 2008. <http://foldoc.org/index.cgi?query=tristate>.*

(Continued)

*Primary Examiner*—Thomas J Cleary
(74) *Attorney, Agent, or Firm*—Carter, DeLuca, Farrell & Schmidt, LLP

(57) ABSTRACT

A system for providing bidirectional communication for a data bus includes a datalink interface component configured to interface into a datalink. The datalink interface component is configured to operate in at least one of a first data communication state, a second data communication state, and a wholly inactive state. The first data communication state causes a first data communication component to communicate via the datalink interface and a second data communication component to be in an inactive state. The second data communication state causes the first data communication component to exist in an inactive state and the second communication component to communicate via the datalink interface. The wholly inactive state causes the first and second data communication components to exist in the inactive state.

12 Claims, 3 Drawing Sheets

U.S. PATENT DOCUMENTS

| | | | |
|---|---|---|---|
| 5,572,685 A * | 11/1996 | Fisher et al. | 710/107 |
| 5,604,450 A * | 2/1997 | Borkar et al. | 326/82 |
| 5,623,672 A * | 4/1997 | Popat | 710/240 |
| 6,172,965 B1 * | 1/2001 | Edwards et al. | 370/250 |
| 6,363,439 B1 * | 3/2002 | Battles et al. | 710/36 |
| 6,453,374 B1 | 9/2002 | Kovalan et al. | |
| 6,823,140 B1 * | 11/2004 | Davidson | 398/73 |
| 7,042,895 B1 * | 5/2006 | Nguyen et al. | 370/442 |
| 2002/0095622 A1 * | 7/2002 | Haycock et al. | 714/39 |
| 2003/0225951 A1 | 12/2003 | Knapp et al. | |
| 2004/0116160 A1 * | 6/2004 | Deas et al. | 455/570 |
| 2005/0271059 A1 * | 12/2005 | Young et al. | 370/389 |
| 2007/0067531 A1 * | 3/2007 | Kolinummi et al. | 710/240 |

OTHER PUBLICATIONS

Rich, Alan. "Shielding and Guarding". Application Note AN-347. Analog Devices. 1983. pp. 1-6.*

"What is Programmable Logic?". Xilinx, Inc. Online May 1, 2003. Retrieved from Internet Dec. 12, 2008. <http://web.archive.org/web/20030501060141/http://www.xilinx.com/company/about/programmable.html>.*

Lin, Charles. "What's a Tri-state Buffer?". 2003. Retrieved from Internet Dec. 12, 2008. <http://www.cs.umd.edu/class/spring2003/cmsc311/Notes/CompOrg/tristate.html>.*

European Search Report for EP 08 10 0409 dated Nov. 17, 2008.

* cited by examiner

TIME MULTIPLEXED BIDIRECTIONAL BUS

BACKGROUND

The present disclosure relates generally to data bus systems, and more specifically to utilizing time division multiplexing on a bidirectional data bus to reduce operating costs, system complexity, increase bus utilization, reduce noise, and/or to combine two or more data buses into one.

Bi-directional data buses are utilized by computing systems to transfer data and/or power among interconnected components (or "cards"). In a unidirectional bus system, typically only one device transmits data while the other devices receive data. In contrast, multiple devices may transmit and/or receive data in a bidirectional bus system. Bus addressing is used so that each receiving device knows whether or not the data being transmitted is intended for that device. The advantage of utilizing a bus rather than some other topology is because buses generally follow the design concept of allowing multiple devices to utilize the same physical medium, e.g., electrical wires. The device or devices that are utilized to transfer data are sometimes referred to as a datalink. A datalink may include one or more buses and/or a bus may be considered a type of datalink. A bus may include one or more wires that may be etched onto a PCB board. Most data bus systems utilize "standards" that may include specifications for connectors, frequency ranges, digital modulation techniques, collision avoidance algorithms, collision detection algorithms, and other features that comply with the standard. Utilization of a standard enables multiple manufactures to design competing and non-competing cards that may easily be connected to a bus via the standardized connector. As long as each of the cards connected to the bus comply with the standard, interoperability between the cards should exist.

Occasionally, certain aspects of a standard are not adopted and/or implemented. For example, if a manufacture wanted to utilize widely available integrated circuit devices following a bus standard but wanted to exclude using any connectors perhaps due to space constraints, the manufacture can utilize the bus standard only to the extent needed for their product. In this scenario, only a customized wire connection used in conjunction with the integrated circuit interface device is necessary. Using this approach can save development, manufacturing, and/or device costs because of the use of widely available integrated circuit interface devices, e.g., an integrated circuit bus transceiver.

However, this approach is not without limitations. For example, if space limitations inherent in the design prevented the use of the standardized connectors, finding other ways of connecting multiple devices to the bus may be necessary. Also, a situation may occur in which multiple datalinks are necessary to the product so as to provide all of the desired features. To that end, multiple datalinks may add unwanted complexity to a product because of the additional components needed. Also, having multiple datalinks in close proximity to each other may increase the likelihood of cross-talk because of undesired capacitive, inductive, or conductive coupling that can occur between one datalink to another. To mitigate the likelihood of cross-talk, additional grounding and/or shielding may be needed either between the two datalinks or between the datalink and free space. Furthermore, because government regulations limit the amount of electromagnetic energy a device may transmit, including multiple datalinks, this further increases the need for shielding and/or additional grounding. These and other aspects, such as increased power and increased heat, have created the need to limit the number of datalinks and/or buses that a device or system includes. Thus, there exists a need to enable the combining of two bi-directional buses without the above mentioned disadvantages.

SUMMARY

According to aspects of the present disclosure, there is provided a system, and method thereof, for providing bidirectional communication for a datalink by time division multiplexing a bidirectional data bus that allows for a reduced number of pin connections and minimizes noisy environments and crosstalk associated with utilizing multiple buses, e.g., externally induced electrical noise and/or signal reflections due to mis-terminated transmission lines. Alternatively, the present disclosure may be viewed as a method for combining two or more bidirectional data buses into a single time multiplexed bidirectional bus interface to support continuous data streaming for the two or more data buses using time division multiplexing ("TDM"). As is well known in the art, TDM is a type of multiplexing in which two or more signals are transferred simultaneously as sub-channels in one communication channel, but physically are taking turns on the channel.

DETAILED DESCRIPTION

The present disclosure provides a system for providing bidirectional communication for a datalink utilizing a time multiplexed bidirectional data bus that allows for a reduced number of pin connections and minimizes noisy environments and crosstalk associated with utilizing multiple buses, e.g., externally induced electrical noise and/or signal reflections due to mis-terminated transmission lines. Alternatively, the present disclosure may be viewed as a method for combining two or more bidirectional data buses into a single time multiplexed bidirectional bus interface to support continuous data streaming for the two or more data buses using time division multiplexing ("TDM"). As is well known in the art, TDM is a type of multiplexing in which two or more signals are transferred simultaneously as sub-channels in one communication channel, but physically are taking turns on the channel.

Figure 1:
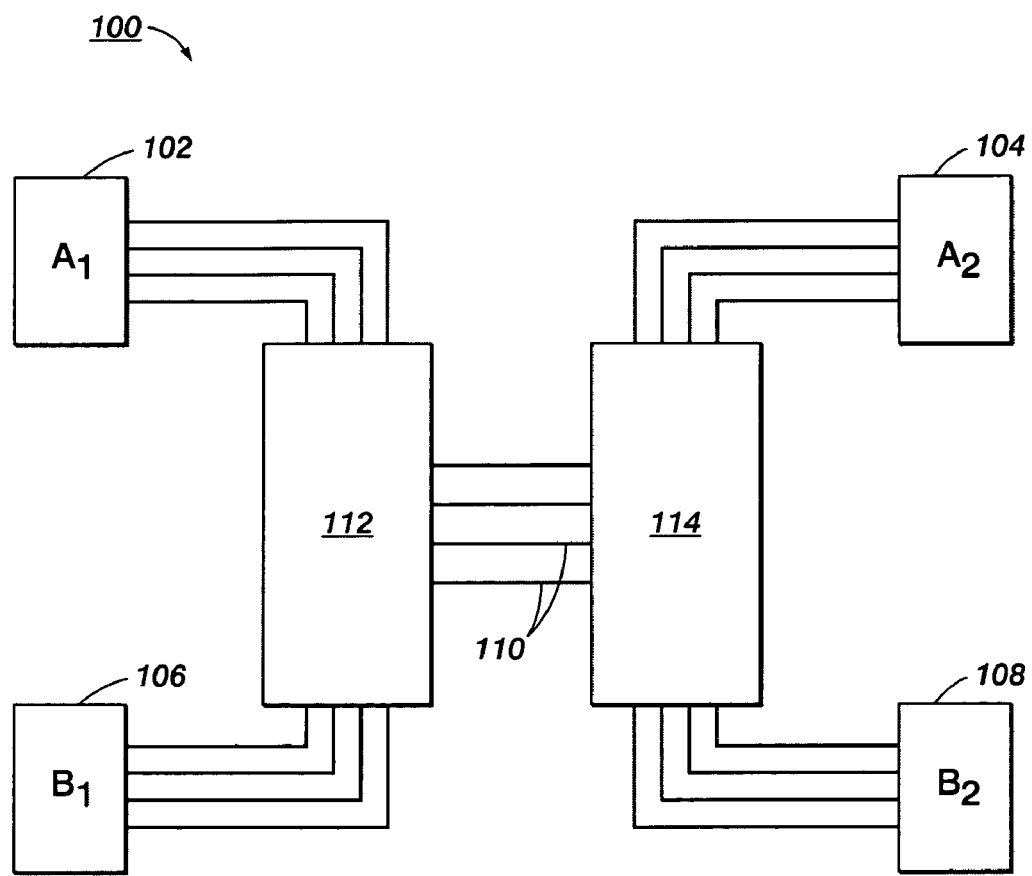
FIG. 1 is a block diagram of a system including a time multiplexed bidirectional data bus according to embodiments of the present disclosure.

In embodiments of the present disclosure, two bidirectional busses A and B are combined into a single bus interface system 100 that represents a combination of data buses A and B, as shown in FIG. 1. System 100 may further include a single set of connector pins and grounds (not shown) to support continuous streaming of data through a datalink 110. In accordance with the present disclosure, continuous streaming of data through datalink 110 may be accomplished by combining two bidirectional busses, such as bus A and bus B, and partitioning the data cycle of system 100 into a plurality of time slots or clock cycles utilizing TDM.

Figure 3:
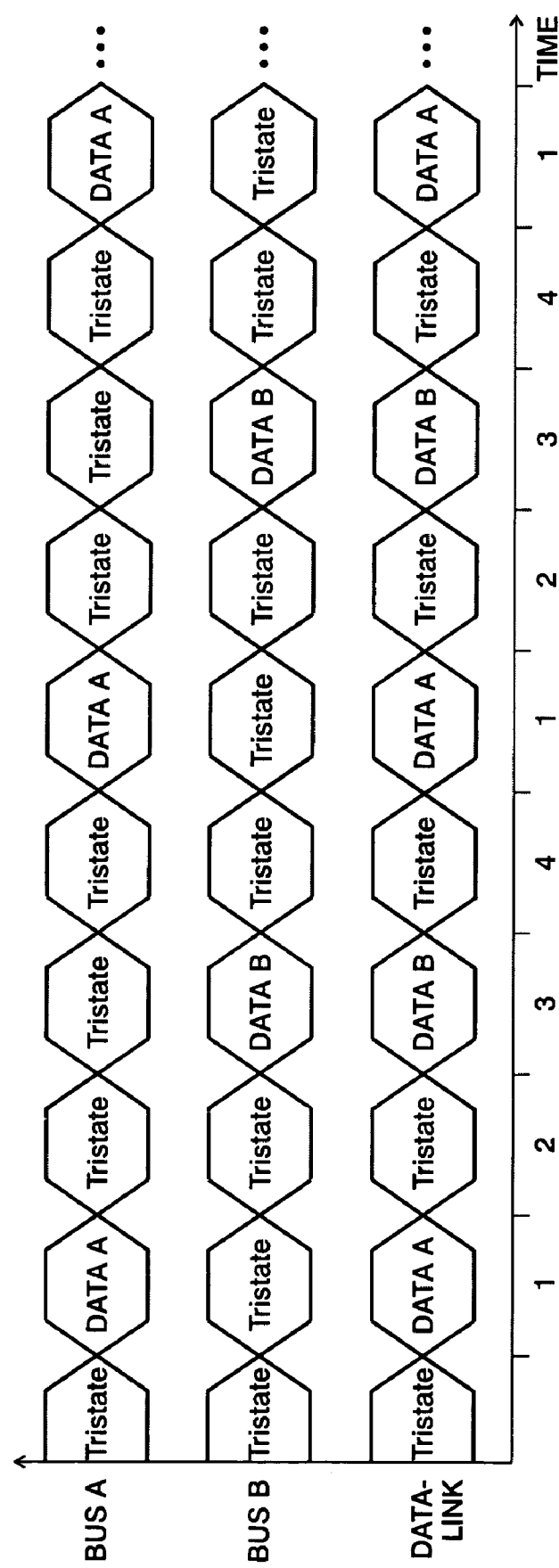
FIG. 3 is a timing diagram illustrating a functional simulation of the present disclosure.

For example, FIG. 3 depicts a timing diagram 300 which illustrates an exemplary data cycle sequence resulting from a functional simulation of the system 100 of FIG. 1. In the present example, the data cycle of system 100 is partitioned into four parts, wherein a sequence of four timeslots or clock cycles is multiplexed. A first timeslot$_1$ and third timeslot$_3$ are allocated for bus A and bus B, respectively, to communicate data through system 100. A second timeslot$_2$ and fourth timeslot$_4$ are allocated for wholly inactive states between first timeslot$_1$ and third timeslot$_3$ to allow sufficient time for bus settling and accommodation of bidirectional data flow, as would be understood in the art.

As to be appreciated, wholly inactive states in the data cycle of system 100 are commonly referred to as "tri-states" and may be a result, for example, of all I/O pins (not shown) of system 100 existing in a high impedance state during a specific timeslot$_n$ or clock cycle. In use, for example, inactivity of bus B during timeslot$_2$ allows bus A sufficient time in which to tri-state system 100 following timeslot$_1$ during which bus A is communicating data. It should be appreciated that timing diagram 300 is illustrative only and other techniques to achieve continuous data streaming of bus A and bus B may be utilized to produce functional simulation results different from illustrated in FIG. 3 and are contemplated by the scope of the present disclosure.

Referring now to the drawings, FIG. 1 illustrates a block diagram of a system 100 providing a time multiplexed bidirectional data bus according to embodiments of the present disclosure. Data communication components 102 and 104 form bidirectional bus A, depicted as A$_1$ and A$_2$ respectively, and data communication components 106 and 108 form bidirectional bus B, depicted as B$_1$ and B$_2$ respectively. Each of data communication components 102, 104, 106, 108 may be, for example, an integrated circuit, a set of transistors, a microcontroller, a microprocessor or the like.

In addition or alternatively, any one of data communication components 102-108 may be, for example, a programmable logic device such as a Complex Logic Programmable Device (CLPD), a Field Programmable Gate Array (FPGA), and/or programmable array logic (PAL). Each of data communication components 102-108 may, for example, utilize software to assist in the TDM stored in RAM, ROM, EEPROM or other data and/or instruction retaining devices including devices that provide volatile and/or non-volatile memory storage. For example, software may be used to program the devices to recognize the present state of system 100 and instruct the device to respond accordingly.

With continued reference to FIG. 1, a first datalink interface component 112 and a second datalink interface 114 are configured to enable operative communication via datalink 110. In use, datalink interface component 112 enables operative communication via datalink 110 between data communication components 102 and 104 and similarly, datalink interface component 114 enables operative communication between data communication components 106 and 108. Datalink 110 may be any technology capable of communicating digital data, for example, a backplane providing digital communications between multiple devices such as data communication components 102-108. For example, datalink 110 may be a VME backplane providing digital communications between components connected to datalink 110.

In use, datalink interface component 112 enables data communication components 102 and 106 (A$_1$ and B$_1$) to operatively connect to datalink 110. Likewise, datalink interface component 114 enables data communication components 104 and 108 (A$_2$ and B$_2$) to operatively connect to datalink 110. As to be appreciated, each of the data communication components 102, 104, 106, and 108 may exist in an inactive state or be tri-stated.

For example, data communication components 102-108 may include hardware that can increase the impedance between any one of data communication components 102-108 and datalink 110 to a level at which digital communication between datalink 110 and the data communication components is restricted. In use under this scenario, datalink interface component 112 prevents either of data communication components 102 and 106 from communicating with datalink 110 and datalink interface component 114 prevents either of data communication components 104 and 108 from communicating with datalink 110. In embodiments, each of data communication components 102, 104, 106, and 108 may provide the necessary hardware and/or software to enable existing in an inactive state or to be tri-stated.

Figure 2:
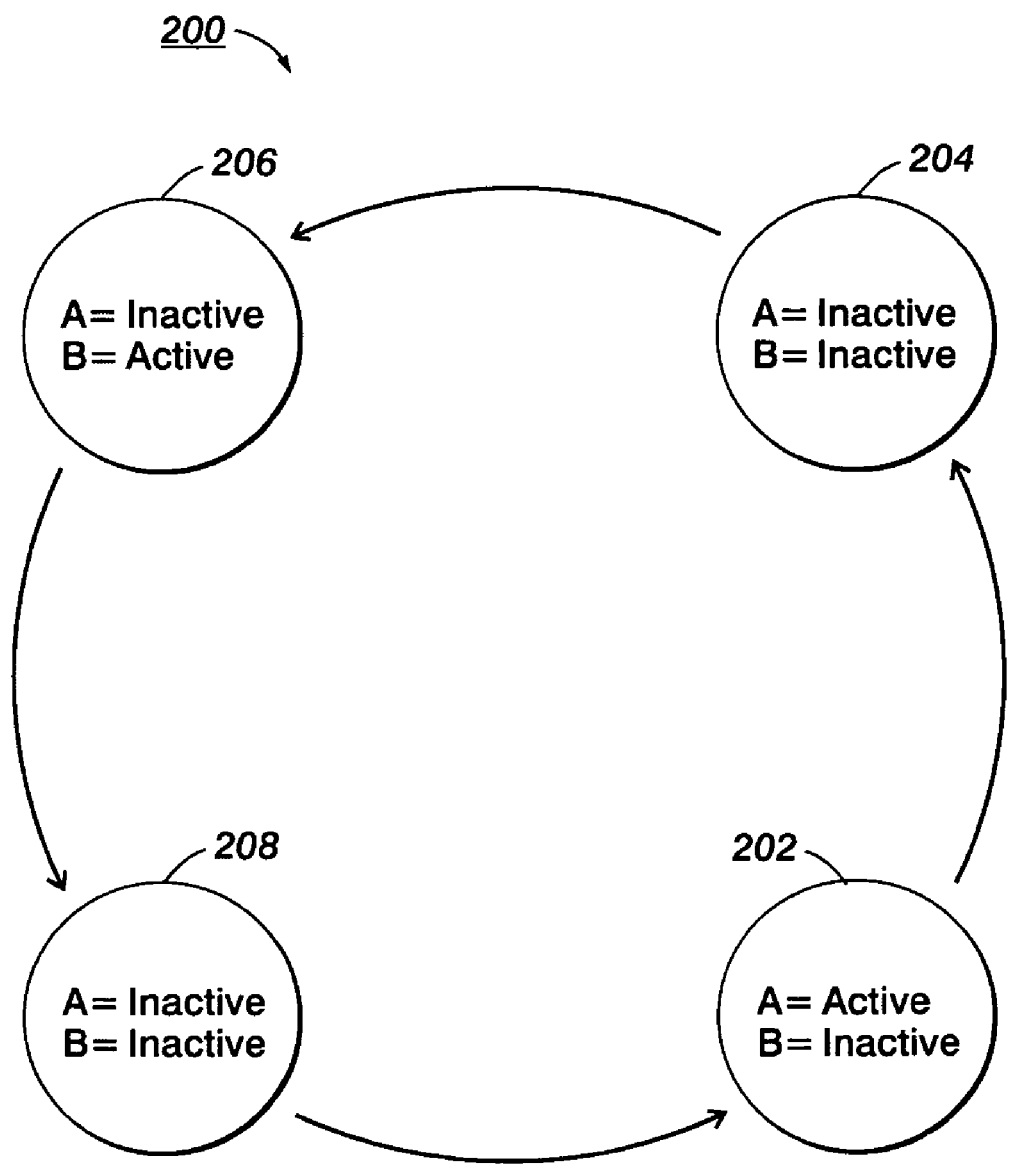
FIG. 2 is a state diagram representing the operation of the time multiplexed bidirectional bus in accordance with the present disclosure.

Referring now to FIG. 2, a state diagram 200 is shown illustrating the operation of system 100 (FIG. 1). In operation, system 100 may be in any one of a wholly inactive state 204 or 208 or a communication state 202 or 206. System 100 (FIG. 1) sequentially progress from state 202, to state 204, to state 206, to state 208, and finally returns to state 202 restarting the sequence. When system 100 is active, the sequence discussed above may continue indefinitely regardless of whether data communications are occurring. A functional simulation of such operation is shown in FIG. 3, illustrating data communications taking place on datalink 110 in relation to the state of system 100 of FIG. 1.

During wholly inactive state 204 or 208, each of the data communication components 102, 104, 106, and 108 exist in an inactive state or are tri-stated and, thus, are not able to access and/or transmit data via datalink 110. Referring to FIG. 3, this may be represented, for illustrative purposes, by timeslot$_2$ or timeslot$_4$. It should be understood that the inactive state or tri-state condition of the data communication components 102, 104, 106, and 108 may be due to datalink interface components 112 and 114 disconnecting corresponding data communication components 102, 104, 106, 108. Alternatively and/or additionally, datalink interface components 112 and 114 may cause connections between corresponding data communication components 102, 104, 106, 108 to become inactive, thereby resulting in an inactive sate or tri-state condition. In FIG. 3, note that during timeslot$_1$, bus A, bus B, and datalink 110 are tri-stated.

With reference to FIG. 3 in conjunction with FIG. 2, communication state 202 initializes the sequence and corresponds to timeslot$_1$. During timeslot$_1$, bus A is active, i.e., data communication components 202 and 204 are communicating between each other utilizing datalink 110, while bus B is inactive or in a tri-stated condition, i.e., data communication components 106 and 108 are placed in an inactive state or are tri-stated.

During communication state 204, data communication components 102 and 104 may fully utilize datalink 110, which is indicated by the label "data A" in FIG. 3 occupying the datalink portion of the timing diagram indicted by timeslot$_1$. It should be appreciated that during each of timeslots$_1$ through n, a fixed amount of time is occupied by each of states 202, 204, 206, and 208. This is an example of one form of TDM. As is typical in the art, the synchronization of system 100 may be implemented by controlling a clock signal utilizing, for example, either an external clock or internal clock having clock mis-synchronization correction capability.

The communication that can occur between data communication components 102 and 104 during communication state 204 may include, but is not limited to, handshaking, packet communications, layered packet protocols and/or additional multiplexing techniques. In use, the communication may utilize asynchronous or synchronous communications and/or parallel or serial communications.

Still referring to FIG. 3 in conjunction with FIG. 2, the next state that occurs after the time allocated for timeslot$_1$, is wholly inactive state 204. Wholly inactive state 204 corresponds to timeslot$_2$, in which both bus A and bus B are in an inactive state or tri-stated. This is indicated by timeslot$_2$, in which each of bus A, bus, B and datalink 110 are indicated as being in a tri-state condition. As to be appreciated, having a wholly inactive state 204 prevents collisions from occurring, in which more that one of data communication components 102, 104, 106, and 108 attempt to drive datalink 110. Absent wholly inactive states 204 and 208, more than one of data communication components 102-108 may attempt to drive system 100 simultaneously, resulting in communication errors.

For example, if data communication component 102 was transmitting to data communication component 104 and, because of slight deviations of timing of the various components, data communication component 108 attempted to start "receiving" data from data communication component 106, then some of the electrical signal being transmitted by data communication component 102 may be improperly intercepted by data communication component 108, which may not be able to distinguish the origination of the data.

Additionally, the circuitry that "drives" datalink 110 may attempt to drive conflicting voltages. For example, if data communication component 102 attempted to place "5 volts" (corresponding to a "1") on a particular wire of datalink 110, and data communication component 106 attempted to "ground" (corresponding to a "0") the same wire of datalink 110, then data communication component 102 may increase the current as much as possible while data communication component 106 would simultaneously attempt to sink as much current as possible. This condition may result in a runaway condition in which components were damaged and/or destroyed. Even if such collisions were detectable, there may be reductions in the utilization of datalink 110 to compensate for these collisions.

Referring again to FIG. 2, communication state 206, which corresponds to Timeslot$_3$ (FIG. 3), is similar to communication state 202, as discussed above, but with bus B being active. In use, during timeslot$_3$ (FIG. 3) datalink 110 is being utilized by bus B, i.e., bus B is shown as being in an active state and bus A is shown as being inactive or tri-stated. During timeslot$_3$, communication between data communication components 106 and 108 is operative while data communication components 102 and 104 are inactive. During timeslot$_3$, bidirectional bus communications of bus B can take place and may include any known bidirectional bus communication known in the art.

State 206 is followed in the sequence by wholly inoperative state 208 as illustrated in state diagram 200 of FIG. 2. Wholly inoperative state 208 is similar to wholly inoperative state 204, as discussed above, and corresponds to time slot$_4$ (FIG. 3) in which all of data communication components 102-108 are inactive, thus, making datalink 110 inactive. Again, utilizing wholly inoperative state 208 prevents collisions and more efficiently utilizes datalink 110. After wholly inoperative state 208, the data cycle proceeds to communication state 202, thereby reinitializing the sequence. The sequence may continue indefinitely.

It will be appreciated that variations of the above-disclosed and other features and functions, or alternatives thereof, may be desirably combined into many other different systems, methods and/or applications. Also that various presently unforeseen or unanticipated alternatives, modifications, variations or improvements therein may be subsequently made by those skilled in the art which are also intended to be encompassed by the following claims.

The invention claimed is:

1. A system comprising:
   a first bidirectional bus and a second bidirectional bus, the first bidirectional bus having at least a first data communication component and the second bidirectional bus having at least a second data communication component; and
   a first datalink interface component and a second datalink interface component configured to interface with a bidirectional communication datalink, where the datalink interface components operate in at least one of a first data communication state, a second data communication state, and a wholly inactive state,
   wherein the first data communication state causes the first data communication component to communicate via the datalink interface components and the second data communication component to be in an inactive state,
   wherein the second data communication state causes the first data communication component to exist in an inactive state and the second data communication component to communicate via the datalink interface components, and
   wherein the datalink interface components combine the first bidirectional bus and the second bidirectional bus into a single bus interface configuration (i) to support continuous data streaming between the first and second bidirectional buses and (ii) to limit a number of total buses in the system.

2. The system of claim 1, wherein the system further comprises a clock signal, wherein the clock signal is partitioned into at least three clock cycles.

3. The system of claim 2, wherein the clock signal partitions are of an approximate equal time duration.

4. The system of claim 1, wherein at least one of the first data communication component and second data communication component is a programmable logic device.

5. The system of claim 1, wherein the first and second data communication components are tri-stated during the their respective inactive states.

6. The system of claim 1, wherein the datalink interface component comprises a VME backplane bus.

7. A method for time-multiplexing first and second data communication components of a communication system, the method comprising:
   providing a first bidirectional bus and a second bidirectional bus, the first bidirectional bus having at least the first data communication component and the second bidirectional bus having at least the second data communication component;
   providing a bidirectional communication datalink;
   providing a clock signal for utilization by a first datalink interface component and a second datalink interface component, wherein the datalink interface components operatively connect to the bidirectional communication datalink, wherein the datalink interface components operate in at least one of a first data communication state, a second data communication state, and a wholly inactive state;
   partitioning the clock signal into at least three clock cycles;
   transmitting data via the datalink interface components from the first data communication component during the first data communication state, wherein the first data communication state exists during one of the at least three clock cycles; and transmitting data via the datalink interface components from the second data communication component during the second data communication state, wherein the second data communication state exists during one of the at least three clock cycles;

wherein the datalink interface components combine the first bidirectional bus and the second bidirectional bus into a single bus interface configuration to (i) support continuous data streaming between the first and second bidirectional buses and (ii) to limit a number of total buses in the communication system.

8. The method of claim 7, wherein the datalink comprises a VME backplane bus.

9. The method of claim 7, wherein at least one of the first data communication component and second data communication component is a programmable logic device.

10. A system for providing bidirectional communication comprising:
  a first bidirectional bus and a second bidirectional bus, the first bidirectional bus having at least the first data communication component and the second bidirectional bus having at least the second data communication component; and
  a first datalink interface component and a second datalink interface component configured to generate a clock signal, said datalink interface components being interfaced with a bidirectional communication datalink and operating in at least one of a first data communication state, a second data communication state, and a wholly inactive state, said first data communication state existing during a first cycle of the clock signal and said second data communication state existing during a second clock cycle of the clock signal;

wherein the first data communication component is configured to communicate via the datalink interface components and the second data communication component is tri-stated during the first data communication state;

wherein the second data communication component is configured to communicate via the datalink interface components and the first data communication component is tri-stated during the second data communication state;

wherein the wholly inactive state exists on a third clock cycle of the clock signal, said third clock cycle existing between the first and second clock cycles, and wherein the datalink interface components combine the first bidirectional bus and the second bidirectional bus into a single bus interface configuration to (i) support continuous data streaming between the first and second bidirectional buses and (ii) to limit a number of total buses in the communication system.

11. The system of claim 10, wherein the clock signal is partitioned into at least three clock cycles.

12. The system of claim 10, wherein at least one of the first data communication component and second data communication component is a programmable logic device.

* * * * *